June 6, 1939.  J. A. POTCHEN  2,161,430
WELDING MACHINE
Filed May 16, 1938    5 Sheets-Sheet 1
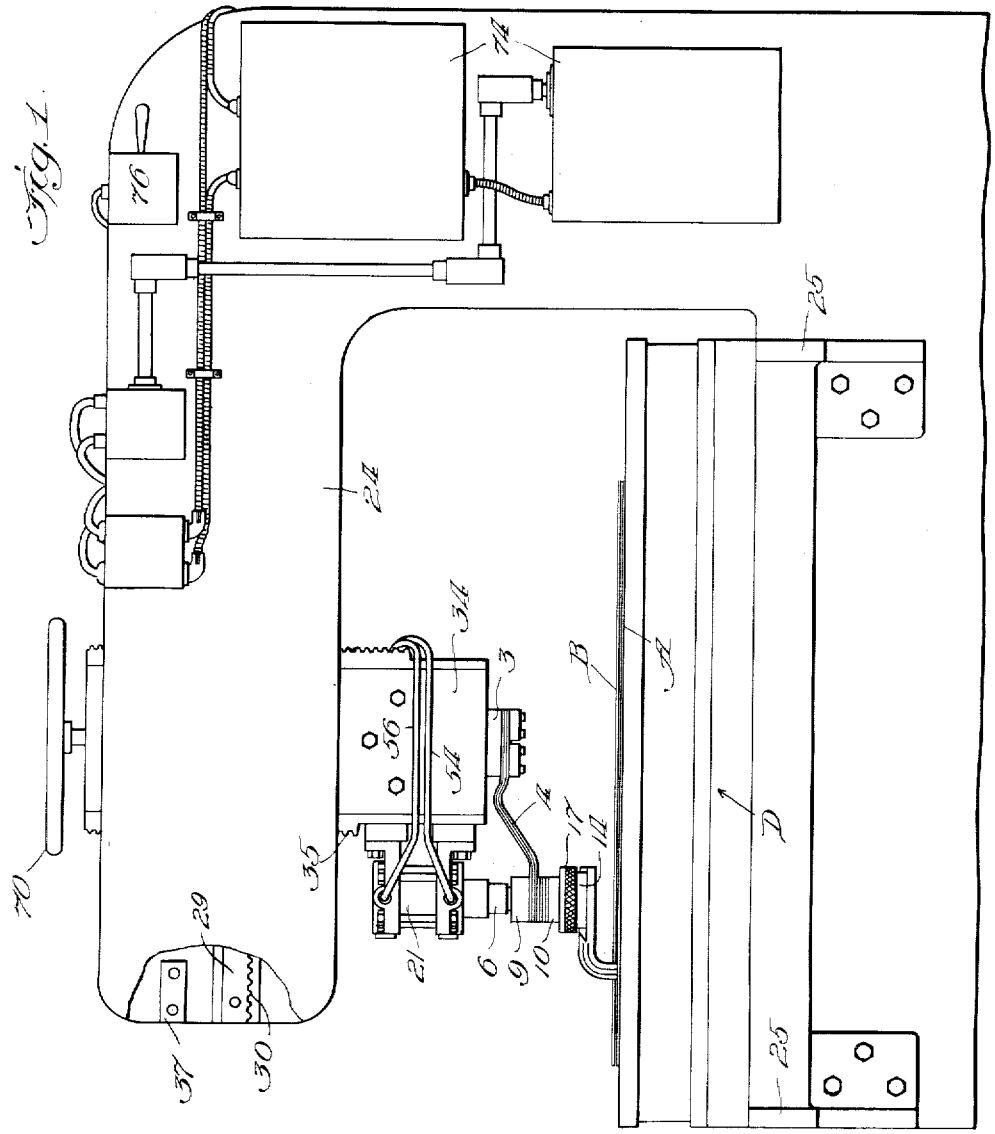

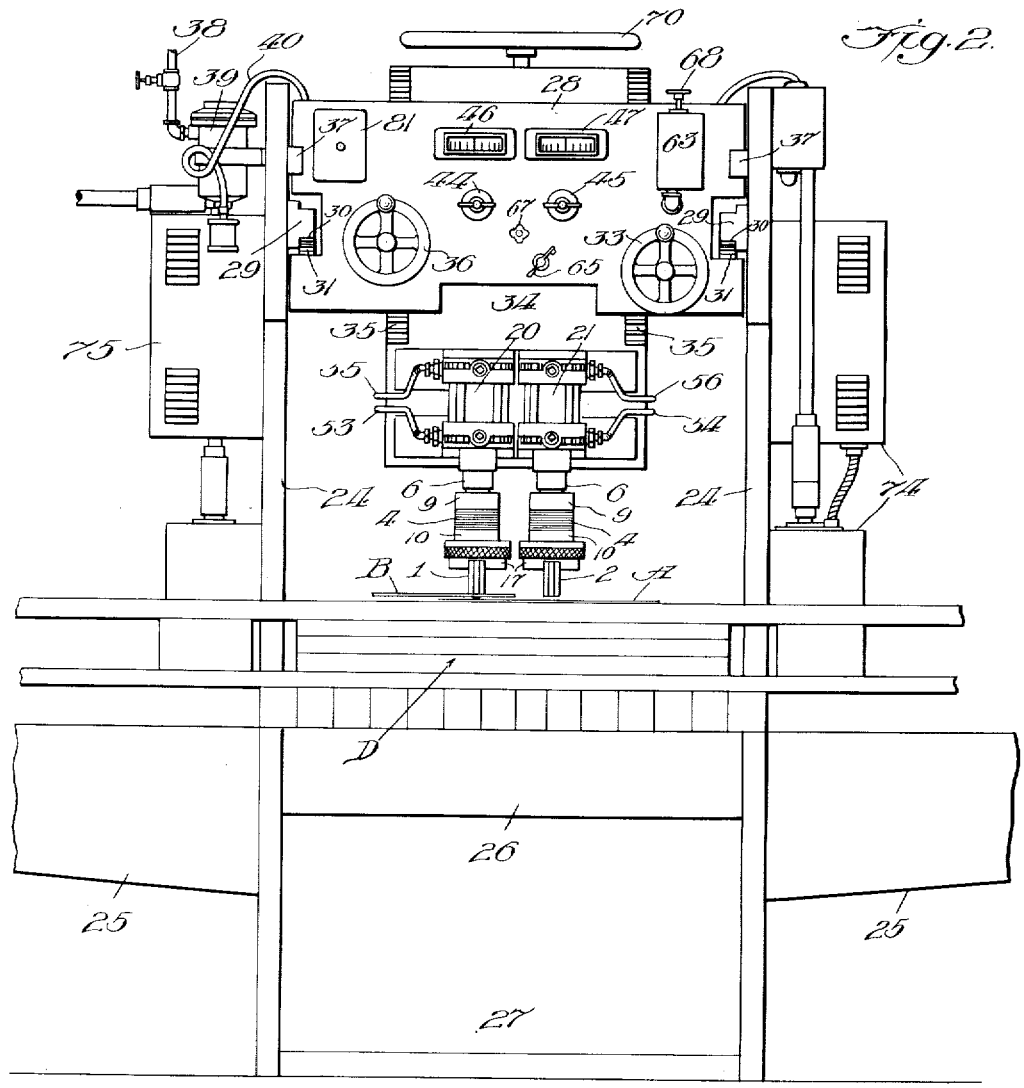

June 6, 1939. J. A. POTCHEN 2,161,430
WELDING MACHINE
Filed May 16, 1938 5 Sheets-Sheet 3
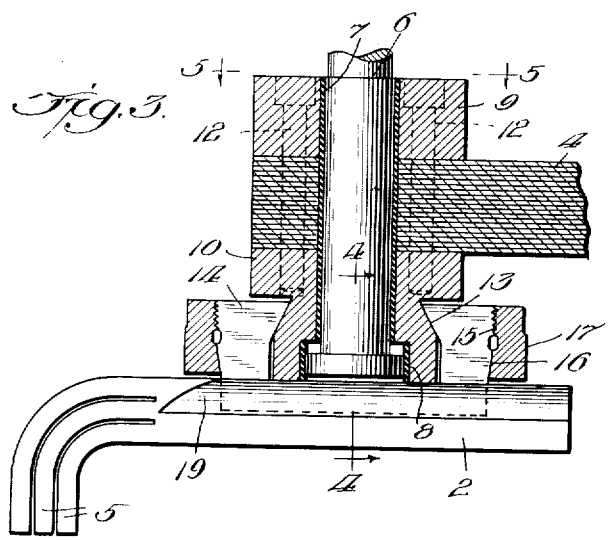
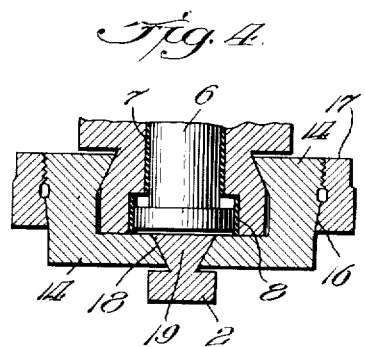
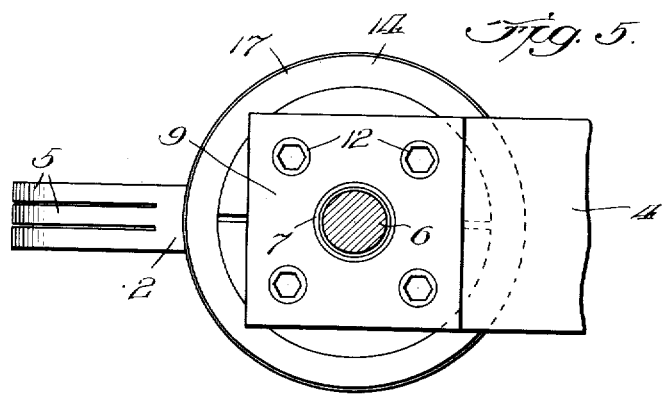
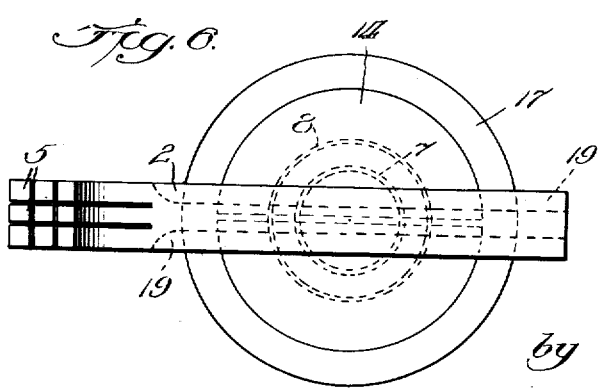
Inventor:
J. A. Potchen
by Wm. F. Freudenreich
Atty.

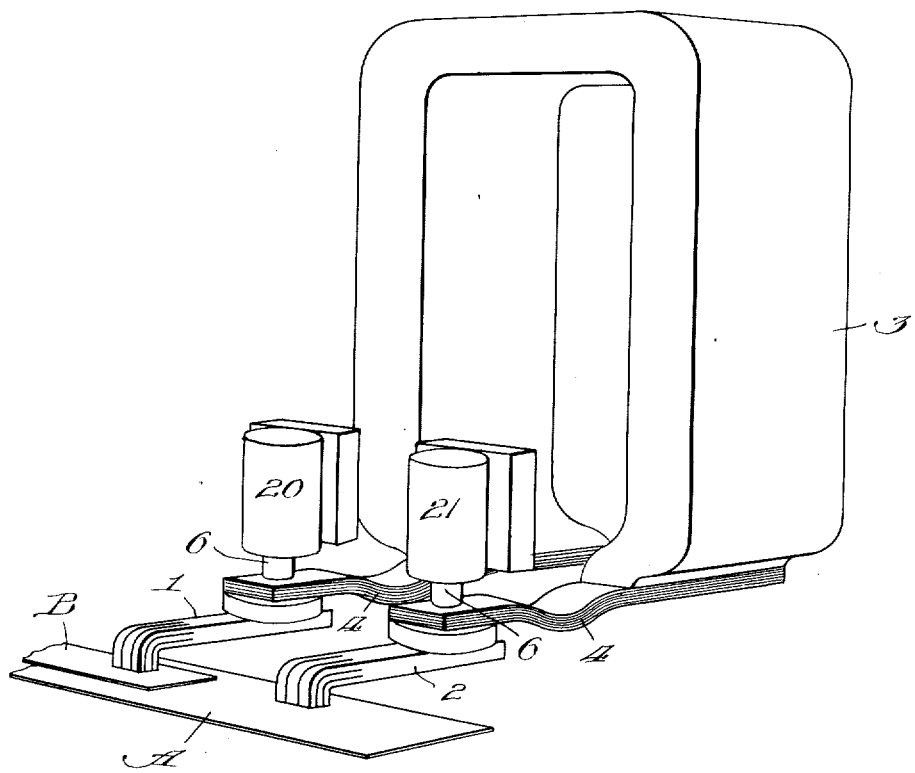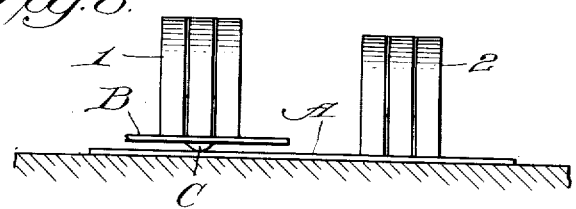

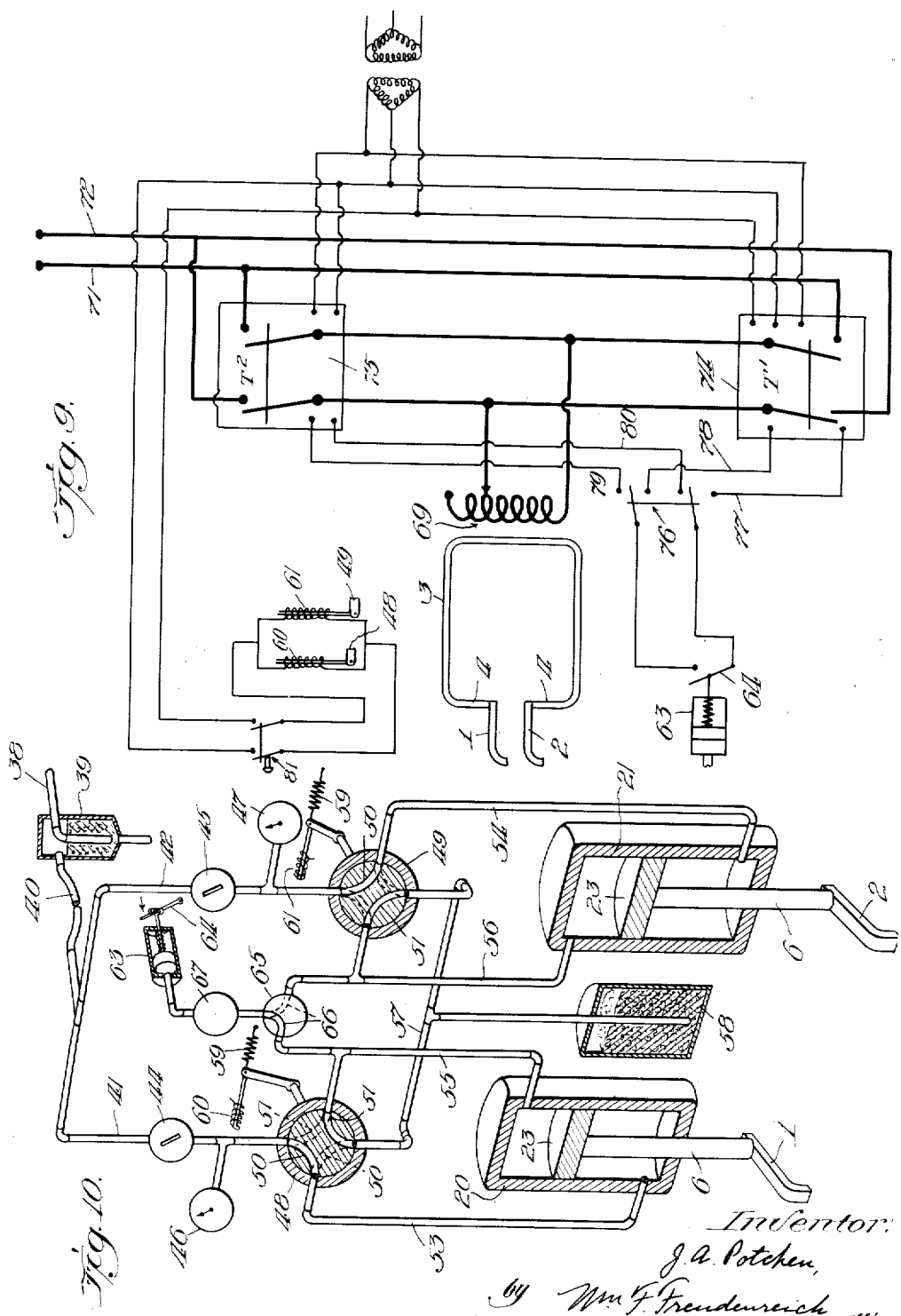

Patented June 6, 1939

2,161,430

UNITED STATES PATENT OFFICE 2,161,430

WELDING MACHINE

Joseph A. Potchen, Grand Rapids, Mich., assignor to Haskelite Manufacturing Corporation, a corporation of New York Application May 16, 1938, Serial No. 208,152

13 Claims. (Cl. 219—4)

In my prior patent, No. 2,087,530, I have disclosed a novel process of uniting two pieces of metal by a form of projection welding wherein a predetermined amount of heat energy is liberated, in a comparatively short time, at one or more points. To achieve this, low voltage, high current electric energy is transformed into heat energy through the resistance at the point or points of the weld. The magnitude of the energy required depends upon the materials to be welded and also upon the means employed in carrying out the process.

The present invention has for its primary object to produce a machine in which said process may be carried out efficiently and effectively under a wide range of working conditions, and with the certainty of obtaining uniformity of results throughout a series of welds made under any given set of conditions.

It is, of course, evident that the more rapidly the pieces of metal are heated to welding temperature at the points where the welds are to occur, the smaller will be the loss of heat energy through conduction of heat away by the metal surrounding such points. In other words, for a given amount of energy required to make the weld, the total energy expended must be greater in making a slow weld than where the weld is quick. Aside from the mere waste of energy, too slow welding has two objectionable consequences. The larger the total energy expenditure, the greater is the danger of distortion, burning or other bad effects on the materials surrounding the weld. In making a slow weld, even though an excessive amount of energy may be utilized, the weld may be a failure because of a difference in the heat conductive properties of the two members which it is sought to unite. Thus, for example, if it be attempted to weld a thin sheet of aluminum to a heavy aluminum block, the thin sheet material may melt and be vaporized before the metal of the block at the welding point becomes hot enough to melt.

Timing is, of course, not the only factor that requires careful attention. The resistance at the welding point is, also, an important factor in determining the intensity of the heat at that point, while other factors in creating and maintaining a stable set of conditions are the resistance and reactance of the energizing circuit up to the welding point.

In carrying out my invention I employ a welding circuit consisting of a transformer secondary and heavy contact members connected thereto by short flexible leads of large cross section. The elements of the machine are so arranged that the work simply spans the contact members and does not extend into the loop of the circuit; whereby neither the character of the pieces being welded nor the positions into which they are shifted in making successive welds causes any variation in the reactance of the circuit. Thus, the resistance of the welding circuit up to the contact members and its reactance are constant, and the only variables in the machine itself, aside from timing and the voltage, that need be taken into consideration, are the resistance at the weld and the resistance between the contact members and the work. Provision is made for controlling the pressure at the welding points and between the contact members and the work, so that any desired resistance at the weld may be obtained and the resistance of the remainder of the circuit may be kept constant throughout a series of welds.

Assuming the voltage of the current induced in the welding circuit to be uniform, then, since the resistance of the circuit up to the contact members is uniform, the strength of the current and the energy concentration at the weld will vary with the resistance at the welding point and at the contact members. It is important that the energy concentration at the welding point shall not vary unduly from weld to weld, in the making of a series of similar welds. This energy concentration depends upon the total resistance of the circuit and the area of contact between the materials at the welding point; the area of contact in projection welding, at least, increasing and decreasing as the resistance at the welding point decreases and increases. In other words, when there is only a light pressure on the materials at the welding point, the area of contact is small and the resistance at the weld high, making the local energy concentration high; whereas, when the pressure is increased, the projections or spacers between the said materials are deformed and create a larger area of contact, thus lowering the energy concentration.

I prefer so to proportion and arrange the parts of the machine that the resistance and reactance of the main portion of the welding circuit shall be low, whereby the effect of an increase in the resistance at the welding point will be greater, in limiting the energy concentration at that point, than would be the case if that resistance constituted a smaller fraction of the whole resistance in the welding circuit. However, where the resistance of the main part of the welding circuit is low, changes in the resistance between the meeting areas of the work and the contact members have a considerable effect on the strength of the current and, therefore, upon the energy concentration at the welding point. It is, therefore, highly desirable that this resistance be under good control so that it may be easily regulated to achieve the best results.

There are two factors that enter into the resistance between the contact members and the work, namely, the pressure on said members that determines the intimacy of engagement over such areas as touch each other, and the size of such areas. If the areas of the surfaces in contact with each other are too small, the concentration of energy there will be so great that not only will a high local resistance be created, that may interfere with proper welding, but the contact members may become fused to the work. Therefore, while my invention has for one of its objects to provide accurate and flexible control of the various pressures, another specific object of the invention may be said to be to produce a novel form of contact member which will insure a larger area of contact between such a member having a large cross-sectional area and the work.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a side elevation of a machine embodying the present invention; Fig. 2 is a front view of the machine; Fig. 3 is a central vertical section through one of the supports for the contact members or shoes, on a larger scale than Figs. 1 and 2; Fig. 4 is a section on line 4—4 of Fig. 3; Fig. 5 is a section on line 5—5 of Fig. 3; Fig. 6 is a bottom plan view of the parts shown in Figs. 3-5; Fig. 7 is a diagrammatic view illustrating the welding circuit, including materials to be welded; Fig. 8 is an edge view of two metal sheets about to be welded together, the contact members having just come into engagement with the sheets; Fig. 9 is a complete electrical diagram; and Fig. 10 is a diagram illustrating the fluid pressure system in the machine.

The machine illustrated in the drawings is one which, although useful for other types of welding, is particularly adapted for making welds in accordance with the process of my aforesaid patent and, for the sake of brevity, the detailed explanation will be confined to the operation of the machine in making the latter type of welds.

Figure 8 shows two pieces of sheet metal, A and B about to be welded together. The sheet A rests on a suitable support and the sheet B has thereon a projection C which rests on the sheet A. A contact member or shoe 1 engages the upper face of the sheet B in registration with the projection on the latter, while a second contact member 2, which may or may not be similar to the companion member, engages with the upper side of the sheet A. When the contact members are properly pressed down and a proper, heavy current is caused to flow between them through the metal sheets, the metal of the projection C and of a small underlying section of the upper region of the sheet A fuses, and a weld is created.

The welding circuit is shown in Fig. 7, in which 3 represents a U-shaped transformer secondary which, in one form of commercial machine, is composed of copper having a cross-sectional area of six square inches. In that machine the contact members are connected to the ends of the arms of the transformer member 3 by flexible copper leads 4 of one and one-half inches area in cross-section. It will be seen that the resistance of the welding circuit up to the points of contact between the contact members with the work is very low and is constant; and that, because the material to be welded simply bridges the gap between the contact members, the reactance of this circuit does not vary as in the case of a machine in which the work is clamped between the contacts or electrodes.

It should also be noted that, not only is the reactance of the welding circuit up to the contact members substantially constant, but the reactance is low because of the small size of the window or loop in the circuit.

The means for supporting and moving the contact members and for connecting them to the flexible leads 4 are best shown in Figs. 3-6. The particular contact members illustrated are in the form of L-shaped bars having longitudinal saw cuts extending through the short arms thereof and past the bends into the long arms. These saw cuts are arranged in two groups at right angles to each other, whereby the short arm of each contact member is divided into a considerable number of relatively small spring fingers, each of which finds its own bearing on the work.

Each contact member is held in a chuck on the lower end of a vertical piston rod 6 projecting from the lower end of a cylinder mounted on the machine as will hereinafter be described. Surrounding and fixed upon the piston rod, and insulated therefrom by sleeves 7 and 8 of suitable insulating material, are two heavy metal blocks 9 and 10. The forward end of each flexible connecting lead 4 lies between two of these blocks and is firmly secured in good conductive relation thereto by a number of screw bolts 12 extending down through the upper block, through the lead and into the lower block. The lower end of the lower block is cylindrical and terminates in an upper section or neck 13 of frusto-conical shape. Surrounding this reduced lower end of the block is a divided cup-shaped member 14, having a bore which is frusto-conical at the top to fit the part 13. The cup has external screw threads 15 around the upper portion and an inverted frusto-conical contour below the screw threads, as indicated at 16. A sleeve nut 17 surrounds the upper part of the cup and has internal screw threads complementary to those on the latter, while the lower end of the bore is frusto-conical to fit the portion 16 of the cup. The divided cup is shaped to form a slot 18, wider at the top than at the bottom, across and through the bottom wall thereof. Each contact member is cut away at the sides to give to the upper region of the long arm thereof the shape of a dovetail spline 19 adapted to fit the slot 18 in one of the divided cups.

The reduced lower end of each block 10 and the corresponding divided cup and sleeve nut comprise a chuck to secure a contact member to one of the pistons and the corresponding flexible lead from the transformer. It will be seen that when the sleeve nut 17 is turned in a direction to move it upward on the divided cup, in Figs. 3 and 4, the cup is contracted somewhat and drawn up on the slope 13 of the block 10. However, when the upper edge of the horizontal arm of the contact member bears against the bottom face of the block 10 the divided cup can move no farther in the upward direction; the result being a clamping of the contact member in the chuck and the clamping of the parts of the chuck together into a rigid whole. It will be seen that the member 14 may be shifted into any position angularly of the axis of the piston rod, so that the contact member may be adjusted, not only in the direction of its length, but also angularly, before being locked in fixed positions. In other words, the work-engaging ends of the contact members may be shifted closer together or farther apart than as they appear in Fig. 7.

The cylinders 20 and 21, containing the pistons 23, with which the piston rods 6 are associated, as seen in Fig. 10, as well as the other operating and controlling devices, are mounted on a frame or body structure containing, in the arrangement shown, three members. The main frame, as illustrated in Figs. 1 and 2 of the drawings, comprises two parallel vertical U-shaped members 24 standing on edge with their arms horizontal and their open ends or sides at the front. The lower arms of these frame members are shown as being provided with long cantilever elements 25 extending laterally in opposite directions to form a long bed upon which suitable work-supporting means may be mounted. Spacers or spreaders 26 and 27 are arranged between and connect together the lower arms of the frame members 24.

Mounted between the upper arms of the U-shaped frame members is a two-section carriage. The section 28 of this carriage spans the distance between the upper arms of the two frame members and is adapted to move in the horizontal direction from front to rear. In the arrangement shown, this section of the carriage is slidably supported on rails 29 having rack teeth 30 in their under edges. Pinions 31 mounted on the carriage, and driven through any suitable driving gearing by a hand wheel 33 on the front of the carriage, mesh with the ratchet teeth and thus constitute means for moving the carriage back and forth.

The second section 34 of the carriage is mounted in the first section so as to be movable vertically relatively thereto. The member 34 may have rack bars 35 at its four vertical corners, these bars being engaged by suitable pinions, not shown, adapted to be rotated by a second hand wheel 36 on the front side of the carriage. Upon turning the wheel 36 in one direction or the other, the section 34 of the carriage may be raised and lowered.

The cylinders 20 and 21 are rigidly fastened to the front side of the carriage section 34. It will thus be seen that the carriage as a whole may be adjusted forwardly or rearwardly to bring the contact members 1 and 2 just over the proper welding positions with respect to work lying on the bed or work support; stops 37 preventing the carriage from being moved forward too far. Then the vertically movable section of the carriage may be lowered to bring the work-engaging faces of the contact members near enough to the work to enable the pistons, in what may be termed the fluid pressure actuators for the contact members, to press said members forcibly against the work.

The controlling and energizing system for the contact member actuators can best be understood by reference to the diagram thereof, comprising Fig. 10 of the drawings. Referring to the diagram, 38 represents a pipe for supplying air under a pressure of fifty pounds or more. The compressed air enters a cleaner and oiler 39 (see Fig. 2) and from there is led through a flexible hose 40 to two branch pipes 41 and 42. These branch pipes contain manually operated or controlled independent pressure reducing valves 44 and 45, respectively, mounted on the front side of the carriage. Pressure gauges, 46 and 47, also mounted on the front side of the carriage, indicate the pressure of the air after passing the reducing valves. The pipes 41 and 42 lead to two-way valves 48 and 49, respectively. Each valve has two passages, 50 and 51. When these valves are in the positions illustrated in full lines in Fig. 10, air flows through the valve 48, through a hose 53 and into the bottom of cylinder 20; and air flows through valve 49 hose 54 and into the bottom of cylinder 21. At the same time the upper ends of the cylinders are vented through hose connections 55 and 56 with these valves and piping 57 leading to atmosphere through a device 58 which separates the oil from the air. When the valves 48 and 49 are turned to bring their passages 50 and 51 into the positions shown in dotted lines, compressed air is introduced into the upper ends of the cylinders and the lower ends are vented. In this way the contact members 1 and 2 may either be held raised above the work or be forced down against the work with any desired degree of pressure.

The valves 48 and 49 may have associated therewith springs 59 which tend constantly to hold them in the positions indicated in full lines in the diagram. The valves are adapted to be moved into their other positions by suitable electromagnetic actuators 60 and 61, respectively, which will be described more fully in connection with the wiring diagram.

I prefer that the welding circuit be energized automatically through the turning on of the air to move the contact members into engagement with the work. To this end, I provide a fluid pressure actuator 63 to which air is admitted for the purpose of closing a controlling switch, indicated at 64. The air for energizing this actuator is supplied whenever air is being admitted to the cylinders 20 and 21. The air pressure may be quite different in one cylinder than in the other and I have found that sometimes it is advisable that the welding current be turned on when the pressure in one or the other of the cylinders, namely the pressure of the corresponding contact member on the work, reaches a predetermined value. In other words, in the making of some welds, the pressure of the contact member over the welding point is an important factor in determining the time of liberating the energy at the welding point; whereas, in other cases such energy liberation should preferably take place when the pressure of the return electrode or contact member on the work has a predetermined value. I have therefore connected the actuator 63 to both of the hoss members 55 and 56 through a two-way valve 65 having a passage 66 which, in the position indicated in full lines in Fig. 10, causes air to be supplied to the actuator at the same pressure as cylinder 20. When the valve 65 is in its other position, the pressure of the air flowing toward actuator 63 is the same as that of the air being delivered to cylinder 21. The valve 65, together with a needle valve 67, to regulate the speed at which pressure builds up in the actuator, are both mounted on the front side of the carriage, within reach of the operator. The switch 64 and its actuator 63 may also be mounted on the front side of the carriage, particularly where the actuator is of the type having a manually-operable device 68, as shown in Fig. 2, through which the pressure at which the switch 64 begins to close may be regulated.

The transformer for supplying the welding current, including the secondary 3 and a cooperating primary winding are, of course, mounted on the vertically-movable section 34 of the transformer. The primary winding 69 of the transformer, as indicated conventionally in Fig. 9, has a series of taps whereby the voltage may be varied. The adjustment of the transformer is effected by a horizontal hand wheel 70 on top of the carriage as shown in Figs. 1 and 2.

I shall now describe the wiring diagram, Fig. 9, as applied to a typical machine. Current for energizing the transformer primary 69 may be supplied by line wires 71 and 72, at a voltage of say 440. This current is delivered to the transformer winding through a timer. In order to obtain a wide timing range I employ two timers, 74 and 75, the first of which will close and open a circuit in from one quarter cycle of a sixty cycle current to one and one-half cycles; while the range of the other is from one and one-half cycles to fifteen cycles. The timer 74 is shown as being one requiring three phase current for its excitation while the timer 75 operates on single phase current. Either timer may be cut in by means of the switch 64 in cooperation with a manually operable double switch 76. In the diagram switch 76 is in its open or neutral position, but if it be shifted so that its two blades engage the terminals on wires 77 and 78, the timer 74 becomes energized upon the closing of switch 64. If, on the other hand, the switch 76 is shifted until its blades engage the terminals on wires 79 and 80, the timer 75 becomes the effective one. The switch 76 is mounted at any convenient point on the frame of the machine as, for example, above the timer 74, as shown in Fig. 1, so that it will be easy for the operator to set this switch to bring the desired timer into play.

It will thus be seen that when the switch 64 is closed by air pressure, as heretofore explained, the switch 76 being set in one of its working positions, the primary of the main transformer will be energized for a short interval of time the length of which depends upon which of the timers is in action. The voltage impressed upon the transformer secondary is low, a convenient range being from 5.5V to 8.8V, and the particular voltage at any given time depending upon the angular position of the hand wheel 70.

Only the manner of actuating the valves 48 and 49 still remains to be explained. As previously stated, these valves are shifted by solenoids 60 and 61, respectively, against the resistance of their springs which tend to hold them normally in such positions that the contact members or electrodes 1 and 2 are held elevated. Referring to the diagram, Fig. 9, it will be seen that the energizing circuits for these solenoids are controlled by a push button switch 81 which is normally open. This switch may be mounted on the front side of the carriage as are many of the other controlling devices, so that the operator need only press the button, after everything has been properly adjusted, in order to produce a successful weld. If there are a number of similar welds to be made, this can be accomplished by simply pressing and releasing the push button switch after each shifting or replacement of materials to be welded. It will be seen that while the contact members are held pressed against the work as long as the operator keeps his finger on the push button, the welding circuit remains energized only so long as the setting of the particular timer in use permits, so that the operator need not take pains to hold the push button switch closed for an exact period of time.

It will thus be seen that I have produced a welding machine in which all of the factors on which a good weld depends, aside from those inherent in the materials to be welded, may be accurately regulated so as best to suit the work in hand; which requires only the pressing of a push button or the like to insure that each contact member shall press upon the work with a progressively increasing force that finally reaches a predetermined maximum, that the welding current shall be delivered when the predetermined pressure conditions are established; and which makes possible the making of an indefinite number of like welds with a single adjustment of the machine and without regard to variable positions of the work on the work support. It will also be seen that I have produced a novel form of contact member or shoe which insures a large total contact area between the same and the work; together with a simple and novel form of chuck for adjustably supporting this or any other style of contact member.

I have referred herein to a work support, the machine itself, being illustrated as having a mere bed upon which any desired stationary or movable supporting means for the work may rest. In the drawings I have shown simply a temporary table D built up of thick wood panels lying flat upon each other and resting on beams laid side by side upon the bed of the machine.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. In a welding machine, a support for materials to be welded, a carriage above and spaced apart from said support, a welding circuit mounted on said carriage and terminating in contact members, and fluid pressure responsive devices on the carriage supporting and serving to raise and lower said contact members.

2. In a welding machine, a support for materials to be welded, a carriage above and spaced apart from said support; means supporting said carriage for movements from and toward said support and also in a horizontal direction; a welding circuit mounted on said carriage and consisting of a transformer secondary, a pair of contact members and short flexible connections between said secondary and said members; and means on the carriage to move said contact members from and toward said support.

3. In a welding machine, a support for materials to be welded, a carriage above said support, means supporting said carriage for movement from and toward said support and also in a horizontal direction, a welding circuit on said carriage terminating in contact members, and fluid pressure actuators on said carriage supporting said contact members and adapted to move them up and down on said carriage.

4. In a welding machine, a work support for materials to be welded, a carriage above said support and movable from and toward the same and also in the horizontal direction, a pair of contact members, fluid pressure devices mounted on said carriage and serving to support said contact members and move them from and toward said work support, a transformer mounted on said carriage, and short flexible leads connecting said transformer secondary to said contact members.

5. In a welding machine, a work support, a carriage mounted above and spaced apart from said support and movable vertically and also horizontally, a transformer on said carriage, contact members flexibly connected to the secondary of said transformer, power devices to lower and raise said contact members into and out of operative relation to work on said support, an automatic timer to close the energizing circuit for the transformer and again open it after a predetermined time interval, and means to set said power devices in operation and then to cause the timer to function when the contact members are exerting a predetermined pressure on the work.

6. In a welding machine, a work support, a transformer, a pair of independently-movable contact members near and flexibly connected to the secondary of said transformer, two independent power devices operable by fluid pressure each arranged to move one of said contact members into and out of operative relation to work on said support, an automatic timer to close the energizing circuit for the transformer and again open it after a predetermined time interval, a third power device operated by fluid pressure to cause the timer to operate, a master controller to cause fluid under pressure to be admitted to all of said power devices, individual pressure-regulating controllers for the first-mentioned power devices to cause each contact member to be operated at any desired pressure, and a controller for the third power device to cause the energizing circuit to be closed at any desired stage of pressure of either contact member on the work.

7. In a welding machine, a work support, independently-movable contact members adapted to be moved toward the support and be pressed against work on the latter, two independent fluid pressure power devices for operating said contact members, a transformer near said power devices, short flexible leads from the transformer to said contact members, an automatic timer adapted to close an energizing circuit for said transformer and again open it after a predetermined time interval, a third fluid pressure power device for setting the timer in operation, means to admit fluid under pressure to all of said power devices, and means to regulate the pressure at each of the first two power devices independently of the other.

8. In a welding machine, a work support, a transformer, a pair of independently-movable contact members flexibly connected to the secondary of said transformer, independent power devices operable by fluid pressure to move said contact members individually toward and from said support to engage work between the same and the support, an automatic timer to close the energizing circuit for the transformer and again open it after a predetermined time interval, a third power device operated by fluid pressure to cause the timer to operate, a master controller to cause fluid under pressure to be admitted simultaneously to all of said power devices, individual controllers for the first two power devices to cause each contact member to exert any desired pressure on the work, and means controlling the admission of fluid to the third power device to cause the closing of the energizing circuit to be delayed until any desired pressure condition between one or the other of the contact members and the work has been established.

9. In a welding machine, a work support, contact members adapted to be moved toward the support and be pressed against work on the latter, fluid pressure power devices for operating said contact members, a transformer near said power devices, short flexible leads from the transformer to said contact members, an automatic timer adapted to close an energizing circuit for said transformer and again open it after a predetermined time interval, a fluid pressure power device for setting the timer in operation, means to regulate the pressure at each contact-operating power device independently of the other, a master controller to admit fluid to both of the last mentioned power devices, and a valve to place the power device for the timer in communication with either of the other power devices.

10. In a welding machine, a work support, a transformer, a pair of contact members flexibly connected to the secondary of said transformer, power devices operable by fluid pressure to move said contact members toward and from said support to engage work positioned between the same and the support, an automatic timer to close the energizing circuit for the transformer and again open it after a predetermined time interval, a power device operated by fluid pressure to cause the timer to operate, a master controller to cause fluid under pressure to be admitted to the power devices for the contacts, individual pressure-regulating controllers for the latter power devices, a valve to place the power device for the timer in communication with that of either of the other two power devices, and a throttle valve to regulate the flow of fluid to the power device for the timer after the operation of the master controller.

11. In a welding machine, a horizontal support for materials to be welded, a carriage above said support and movable from and toward the same and also in the horizontal direction, vertical cylinders mounted on said carriage, pistons in said cylinders, chucks on the lower ends of said pistons, contact members held in said chucks, a transformer mounted on said carriage, short flexible leads connecting said transformer secondary to said contact members, and means to admit fluid under pressure into said cylinders to force the contacts down and to cause the transformer to be energized for a predetermined interval of time beginning at the instant when the cylinder pressure reaches a predetermined value.

12. In a welding machine, a work support for materials to be welded, a carriage above said support comprising two sections one of which is movable in the horizontal direction while the other section is mounted on the first section for vertical movements with respect thereto, a pair of contact members, fluid pressure devices mounted on the vertically movable section of said carriage and serving to support said contact members and move them from and toward said work support, a transformer mounted on the vertically movable section of said carriage, and short flexible leads connecting said transformer secondary to said contact members.

13. In a welding machine, a work support, a movable carriage above said work support, a transformer on the carriage having a secondary in the form of an inverted U, short flexible leads projecting from the lower ends of the arms of the transformer secondary, a pair of contact members connected to the forward ends of said leads, and power devices above said contact members to raise and lower the same and the adjacent ends of the leads.

JOSEPH A. POTCHEN.

DISCLAIMER 2,161,430.—*Joseph A. Potchen*, Grand Rapids, Mich. WELDING MACHINE. Patent dated June 6, 1939. Disclaimer filed October 26, 1940, by the assignee, *Haskelite Manufacturing Corporation*.

Hereby enters this disclaimer as to claim 1 in said Letters Patent.

[*Official Gazette December 17, 1940.*]